US007289910B2

(12) United States Patent
Voutay et al.

(10) Patent No.: US 7,289,910 B2
(45) Date of Patent: Oct. 30, 2007

(54) METHOD FOR PACKING AND FILTERING GEOPHYSICAL EVENTS TO RETRIEVE THEREFROM DATA ON THE TYPE OF SUBSOIL

(75) Inventors: Olivier Voutay, Paris (FR); Frédérique Fournier, Cormeilles En Parisis (FR); Jean-Jacques Royer, Nancy (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 41 days.

(21) Appl. No.: 10/527,082

(22) PCT Filed: Aug. 18, 2003

(86) PCT No.: PCT/FR03/02543

§ 371 (c)(1),
(2), (4) Date: Dec. 14, 2005

(87) PCT Pub. No.: WO2004/025327

PCT Pub. Date: Mar. 25, 2004

(65) Prior Publication Data

US 2006/0155470 A1    Jul. 13, 2006

(30) Foreign Application Priority Data

Sep. 10, 2002 (FR) .................................. 02 11200
Feb. 17, 2003 (FR) .................................. 03 01900

(51) Int. Cl.
*G01V 1/28*   (2006.01)
*G01V 9/00*   (2006.01)
*G01V 11/00*  (2006.01)

(52) U.S. Cl. ........................................................... 702/14
(58) Field of Classification Search ................. 702/14, 702/16, 17; 367/73
See application file for complete search history.

(56) References Cited

U.S. PATENT DOCUMENTS 4,937,747 A    6/1990    Koller
6,052,651 A    4/2000    Fournier

OTHER PUBLICATIONS

IEEE Transactions on Geoscience and Remote Sensing, vol. 37, No. 1, Jan. 1999.

*Primary Examiner*—Donald E McElheny, Jr.
(74) *Attorney, Agent, or Firm*—Antonelli, Terry, Stout & Kraus, LLP.

(57) ABSTRACT

The invention relates to a method for packing and filtering geophysical events read on multi-domain records, with distribution of said events into families each having a particular geophysical significance: iso-offset or iso-incidence angle data cubes, elastic parameter cubes derived from a joint stratigraphic inversion and the like, in order to extract therefrom data on the type of subsoil, using a multivariate statistical technique. The method essentially comprises forming, by combination of geophysical variables, synthetic variables much fewer in number, which are obtained by constructing an orthogonal vector base in each of the sets of analysis constituted by the data of each of the families, wherefrom is derived the formation of an orthonormal vector base (new attributes) for filtering and describing said geophysical events. The invention is applicable to geological interpretation or to interpretation of an underground reservoir, from seismic measurements or logs for example.

32 Claims, 5 Drawing Sheets

- Class 1 : sand turbidites
- Class 2 : mud turbidites
- Class 3 : hemipelagite 500 meters

FIG.9A     FIG.9B

500 meters

FIG.10A     FIG.10B

500 meters

Class 1   Class 2   Class 3   Class 4   Class 5

METHOD FOR PACKING AND FILTERING GEOPHYSICAL EVENTS TO RETRIEVE THEREFROM DATA ON THE TYPE OF SUBSOIL

BACKGROUND OF THE INVENTION

1. Field of the Invention

The present invention relates to a method for packing and filtering geophysical data in order to retrieve therefrom information on the nature of the subsoil.

2. Description of the Prior Art

Geophysical measurements are conventionally used to provide complementary information, in relation to direct observations in wells, on the geologic properties variations of underground formations. Seismic interpretation is for example based on the analysis of attributes in order to retrieve these geologic properties from the seismic information, in a zone of interest of an underground formation (reservoir zone for example). Another example is log interpretation where the various measurements are simultaneously analyzed to deduce therefrom the petrophysical characteristics of the underground formation studied.

A standard approach for seismic or log attributes analysis involves the use of statistical pattern recognition and estimation methods in order to calibrate the pertinent attributes with the available information obtained in various wellbores.

For example, French Patent 2,768,818 and corresponding U.S. Pat. No. 6,051,651 filed by the assignee describes a method allowing detection of the potential classes in a population of events related to the physical properties of a complex medium such as the subsoil, located from data obtained by subsoil exploration or by in-situ measurements (events of geologic, geophysical nature, events linked with fluid production data, etc.), these events being located by points in a multi-variable space and defined by an attributes vector.

Another example is given by French Patent Application 01/05,675 filed by the assignee, which describes a method for facilitating monitoring over time of the evolution of an underground zone by compared analysis of a certain number n of seismic records successively obtained after n successive 3D seismic surveys (4D seismic method), wherein a pattern recognition technique applied to the whole of the seismic events of several surveys, considered and analyzed simultaneously, is used.

EP Patent A-671,017 and corresponding U.S. Pat. No. 5,638,269 filed by the assignee can also be mentioned, which describe a method allowing establishing of a connection between geologic data obtained by coring or logging in wells and seismic data obtained by means of a seismic exploration survey, which is based on a statistical calibration technique with statistical calibration obtained by bringing together the local geologic data (measured in wells) and seismic attributes read on seismic traces obtained in the immediate vicinity of each well.

The seismic attributes that are subjected to such an interpretation are calculated in the post-stack or in the pre-stack domain.

In the post-stack domain, the conventional attributes are calculated from the amplitudes at the reservoir level, or from the impedance P estimated by means of a stratigraphic inversion.

In the pre-stack domain, the number of pertinent attributes can increase considerably. In this case, the attributes are either the amplitudes at different offsets or incidence angles, or parameters obtained from a pre-stack joint stratigraphic inversion (impedances P and S, density, product of the Lame parameters with the density, etc.).

Concerning the interpretation of logs, the situation is similar to a very large number of measurements being available, hence a large number of attributes allowing characterization of the logs, these attributes being often organized in families of equal physical significance (for example family of the resistivity attributes, family of the attributes associated with the natural or induced radioactivity of the formations, etc.).

A method referred to as principal components analysis (PCA) method, well known in the art, can be applied to these attributes in order to analyze the relations existing between them and to reduce the number of significant attributes. The principal components extracted from the PCA are the new attributes: they define an orthogonal or non-orthogonal (rotation) vector base and are linear combinations of initial variables. They can be used in statistical pattern recognition algorithms and correspond to a multivariate filtering of the initial seismic or log information. Various applications of the PCA method are for example described in:

Dumay, J., Fournier, F., 1988, "Multivariate Statistical Analyses Applied to Seismic Facies Recognition", Geophysics, 53, 1151-1159, Hagen, D., C., 1982, "The Application of Principal Component Analysis to Seismic Data Sets", Geoexpl., 20, 93-111, or French Patent A-2,772,138 and corresponding U.S. Pat. No. 6,345,108 filed by the assignee.

However, PCA does not take into the attributes group and, consequently, it is often difficult to give a physical interpretation of the principal components, or to relate them clearly to the initial attributes, especially if they are organized in groups of equal physical significance.

The analysis referred to as canonical analysis is also a statistical method well known in the art, which allows establishing the relations that may exist between two sets of variables in order to know if these two sets describe the same properties. This method is for example described by:

Hotelling, H., 1936, "Relations Between Two Sets of Variables", Biometrika, 28, 321-377.

An example of application of canonical analysis is for example described by:

Fournier, F., and Derain, J. F., 1995, "A Statistical Methodology for Deriving Reservoir Properties from Seismic Data", Geophysics, 60, 1437-1450.

This method is limited to the study of two sets of variables and does therefore generally not apply to the multicube seismic information or to the multidomain log information. Furthermore, it defines synthetic variables in each subspace associated with the two sets, and not a single vector base allowing packing the whole of the initial variables and to describe the relation between the two sets.

There are several methods allowing generalization of the analysis referred to as canonical analysis by extending the analysis to more than two sets of variables. Different aspects of the prior art in the field considered are described, for example, in the following publications:

Horst, P., 1961, "Relations Among M Sets of Measures", Psychometrika, 26, No. 2, 129-149, Caroll, J. D., 1968, "A Generalization of Canonical Correlation Analysis to Three or More Sets of Variables", Proc. $76^{th}$ Conv. Amer. Psych. Ass., Kettenring, J. R., 1971, "Canonical Analysis of Several Sets of Variables", 58, 3, 433-450, or Saporta, G., 1990, "Probabilites, Analyse des Donnees et Statistiques", Technip, Paris.

These methods however have certain limits. In particular, they do not allow describing each set separately, the synthetic variables cannot be readily related to the various sets and, consequently, be physically interpreted. Furthermore, only the global inertia part they represent can be known, and not the inertia part they represent for each set. It is therefore not possible to filter each set independently.

Another known analysis technique referred to as generalized principal components analysis (GPCA) allows comparison of different sets of variables while describing each one. It is implemented on data of economic nature for example in:

Casin, Ph., 2001, "A Generalization of Principal Component Analysis to K Sets of Variables", Computational Statistics & Data Analysis, 35, 417-428.

SUMMARY OF THE INVENTION

The method according to the invention provides an approach wherein, by implementing a multivariable statistical technique applied to several sets of seismic records or logs available, obtained by exploration of an underground zone, the geophysical events readable on these sets of measurements are packed and filtered. The method comprises:

distributing these geophysical events into a certain number p of families of geophysical attributes having each a particular physical significance;

forming, by combination of the geophysical attributes, synthetic variables in much fewer number than the number of the attributes, which are obtained by construction of an orthogonal vector base in each one of the p analysis sets consisting of the data of each one of the families, wherefrom is derived the formation of an orthonormal vector base describing the p analysis sets;

using the orthonormal vector base for filtering and describing the geophysical events.

The methodology for packing and filtering geophysical data in order to retrieve therefrom information on the nature of the subsoil is applied to packing and filtering sets of multi-domain geophysical data, i.e. either pre-stack seismic data from a 3D seismic survey grouped into a certain number of data cubes corresponding each, for example, to the same offset (seismic trace cubes referred to as iso-offset cubes) or to the same angle of incidence (referred to as iso-incidence angle cubes), or seismic attribute cubes obtained by seismic amplitude processing such as, for example, elastic properties cubes from a joint stratigraphic inversion of pre-stack seismic data, these cubes being obtained by implementing the method described for example in French patent 2,800,473 (EP-1,096,270) filed by the assignee. It then shapes the pre-stack seismic information contained in seismic trace portions formed by exploration of an underground zone, by means of new representative attributes which are thereafter used for geologic interpretation or interpretation of an underground reservoir. It can also apply to packing and filtering of pre-stack or post-stack 3D seismic data from repeated surveys (4D seismic method) in order to interpret the fluid content variations of a petroleum reservoir under production. This method is also applicable to packing of log data of several physical natures by forming, from initial measurements, new log attributes in order to improve interpretation of the log data in terms of lithologic and petrophysical characteristics of the reservoir.

Formation of the synthetic variables is obtained for example by combining a principal components analysis technique or its derived techniques based on diagonalization of a norm (seeking eigenvectors) and a simple regression technique.

According to an implementation mode, the synthetic variables can be subjected to a rotation so as to improve the correlations between initial variables, that is the geophysical attributes, and synthetic variables.

The synthetic variables can be formed from families comprising for example one or more seismic trace cubes obtained after a 3D seismic survey, each one corresponding to the same offset.

Synthetic variables can also be formed from families consisting of seismic trace cubes obtained after a 3D seismic survey, each one corresponding to the same angle of incidence.

Synthetic variables can also be formed from families consisting of seismic attribute cubes formed by processing the seismic trace amplitudes obtained at the end of a 3D seismic survey.

Synthetic variables can also be formed from families consisting of seismic trace cubes obtained after successive seismic surveys in the zone.

It is also possible to form synthetic variables from families consisting of seismic attribute cubes formed by processing the seismic trace amplitudes obtained after successive seismic surveys in the zone.

Synthetic variables can also be formed from families consisting of measurements of log attributes of different physical nature, such as the family of resistivity measurements, the family of measurements related to the formation radioactivity, the family of measurements related to the formation porosity, etc.

The method is particularly advantageous in that it allows, when applied to seismic or log data:

to define new geophysical attributes, linear combinations of the initial geophysical attributes, summarizing the initial seismic or log data and allowing filtering of this data, while respecting the multidomain structure of the data;

to show if all the families of initial geophysical attributes, or only some of them, provide redundant information, and to measure the part of this redundant information; and to give a physical interpretation to the new geophysical attributes.

The new geophysical attributes thus formed can then be analysed in order to retrieve the geologic properties of the seismic or log data. Two classes of methods can be conventionally used therefore: a first one using statistical estimation techniques and providing quantitative interpretation in terms of geologic properties, and a second one using pattern recognition techniques to analyze the seismic facies or the log facies (electrofacies) and provide qualitative information.

Examples of these two types of methods are respectively implemented in the aforementioned EP Patent 671,017 and U.S. Pat. No. 5,638,269 and French Patent 2,768,818 and corresponding U.S. Pat. No. 6,051,651 filed by the applicant.

DETAILED DESCRIPTION OF THE INVENTION

Figure 1A:
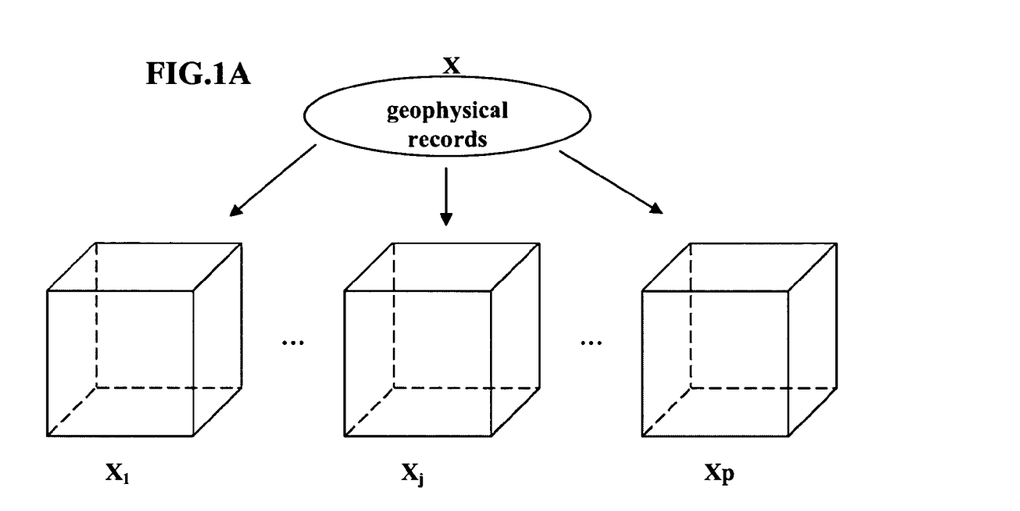
FIGS. 1A to 1C show the organization of the seismic records in p sets each set groups in a cube all of the trace portions corresponding to an identical physical criterion.
Figure 1B:
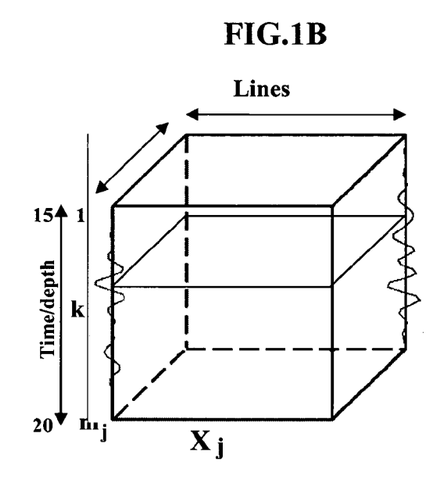
Figure 1C:
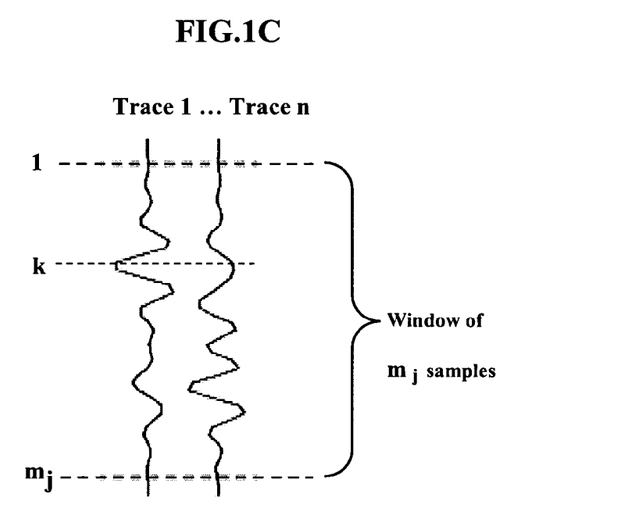
Figure 2A:
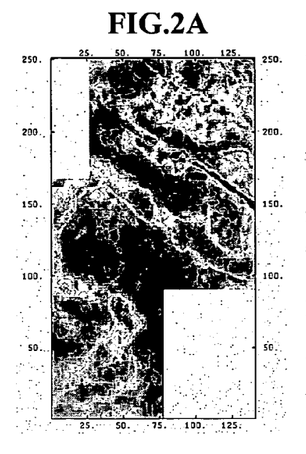
FIGS. 2A to 2C respectively show the maps of the first three new seismic attributes $Z^{(1)}$, $Z^{(2)}$ and $Z^{(3)}$.
Figure 2B:
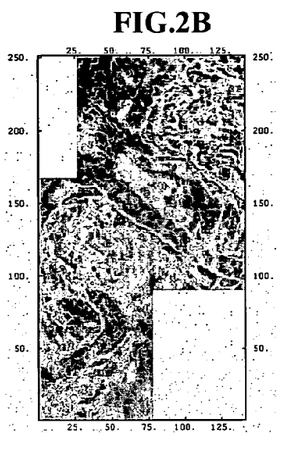
Figure 2C:
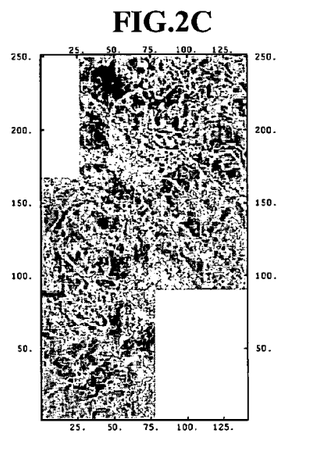
Figure 3A:
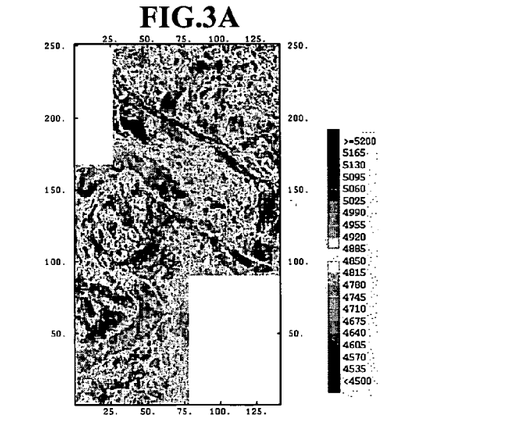
FIGS. 3A to 3D respectively show the first true temporal plane (3A) of the analysis window and the same plane reconstituted/filtered with 1 (3B), 3 (3C) or 8 (3D) of the new seismic attributes for the cube of impedance P.
Figure 3B:
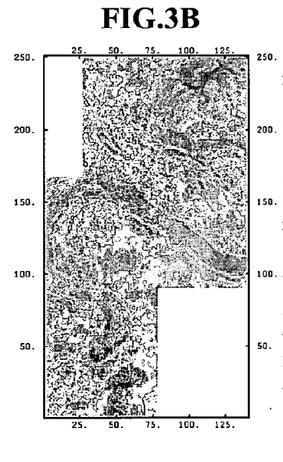
Figure 3C:
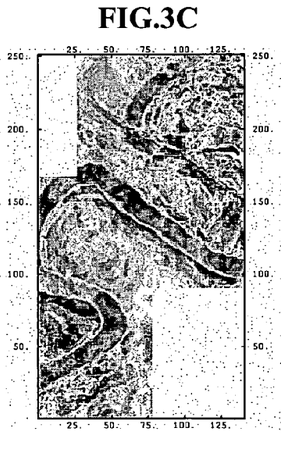
Figure 3D:
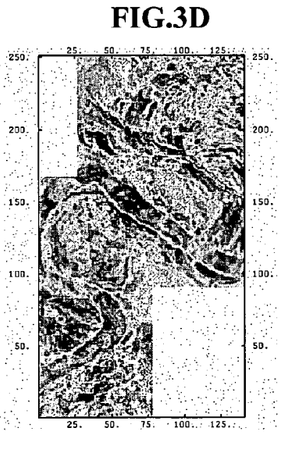
Figure 4A:
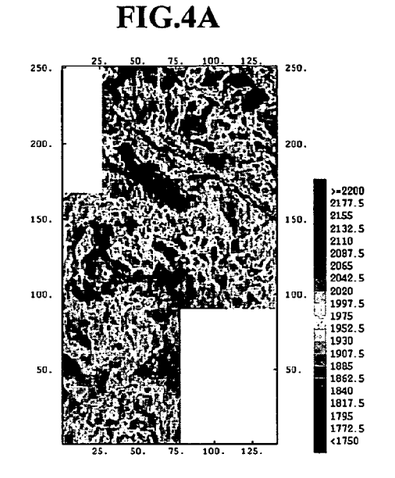
FIGS. 4A to 4D respectively show the first true temporal plane (4A) of the analysis window and the same plane reconstituted/filtered with 1 (4B), 3 (4C) or 8 (4D) of the new seismic attributes for the cube of impedance S.
Figure 4B:
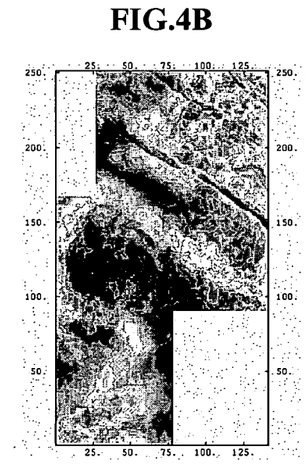
Figure 4C:
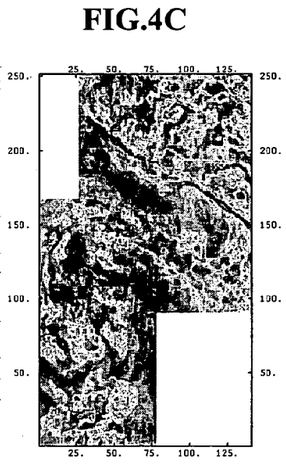
Figure 4D:
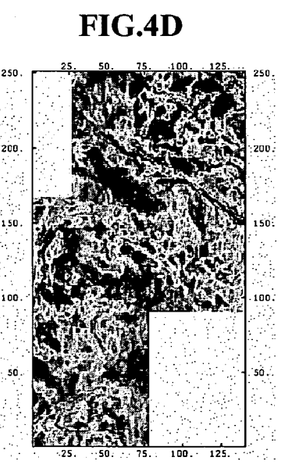
Figure 5A:
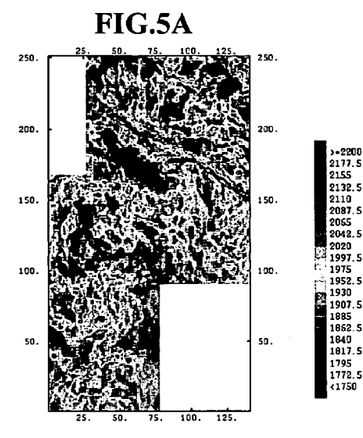
FIGS. 5A to 5D respectively show the first true temporal plane (5A) and the same plane reconstituted/filtered with 1 (5B), 3 (5C) or 8 (5D) of the new seismic attributes for the cube of density $\rho$.
Figure 5B:
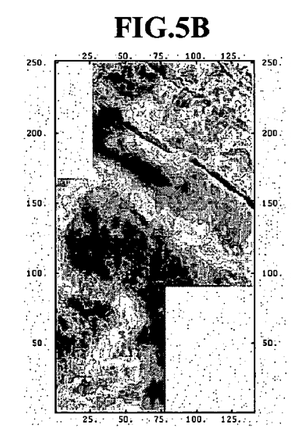
Figure 5C:
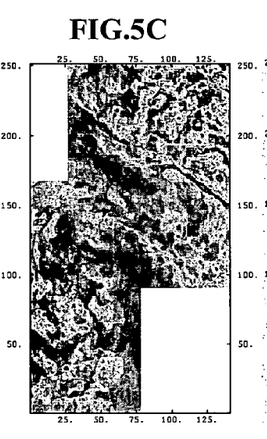
Figure 5D:
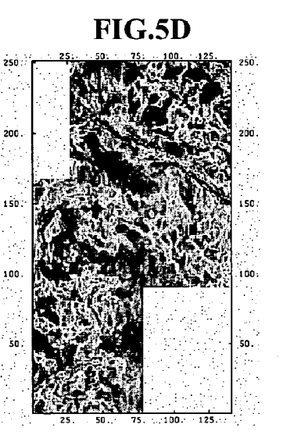
Figure 6:
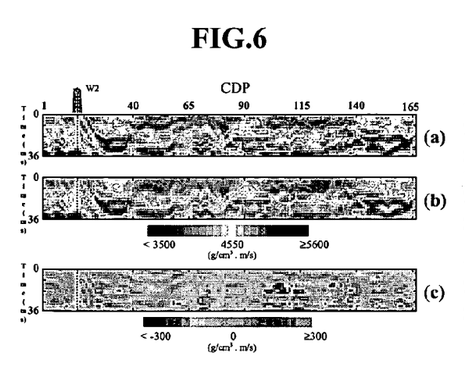
FIG. 6 respectively show the vertical sections, passing through well W2, true (6A), reconstituted/filtered with the first 8 new attributes (6B), and the differences (residues) (6C) between these two sections for the cube of impedance P.
Figure 7:
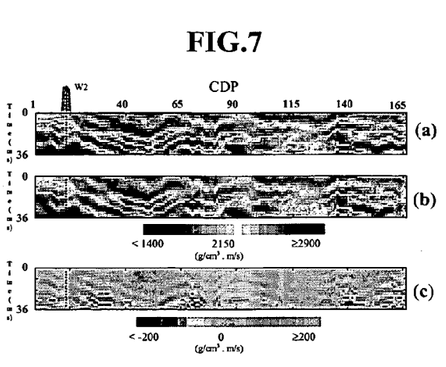
FIGS. 7A-C respectively show the vertical sections, passing through well W2, true (7A), reconstituted/filtered with the first 8 new attributes (7B), and the differences (residues) (7C) between these two sections for the cube of impedance S.

Several sets of geophysical records obtained by seismic exploration or logging in an underground zone studied are available. The geophysical events to be packed/filtered are characterized by geophysical attributes often organized in sets or families of particular physical significance (FIGS. 1A to 1C). These attributes can be the succession of the amplitude values of seismic trace portions or of elastic parameters from a pre-stack joint elastic inversion, obtained for example by means of the method described in the aforementioned French Patent 2,800,473 and EP 1,096,270 along the time window studied. These attributes can be, for a given depth, the measurements of a single set of logs obtained along a well, such as for example the values of the different resistivity tools, the values of the different tools measuring the porosity, etc.

1—NOTATIONS

Let X be a matrix consisting of p juxtaposed tables $X_1, \ldots X_j \ldots X_p$:

$X = \{X_1 \ldots X_j \ldots X_p\}$, $X_j = [X_{j,1} \ldots X_{j,k} \ldots X_{j,mj}]$ where $X_j$ is a table consisting of $m_j$ variables $X_{j,k}$ of n individuals (in the statistical sense of the term). Matrix X groups together all the geophysical events available. These events are first organized in p sets or families $X_j$ (FIG. 1A). Each family $X_j$ corresponds to a particular physical property. For analysis of the 3D seismic survey, this family has the form of a cube of values corresponding to this property, located by their spatial position (line, cdp, time/depth) (FIGS. 1B and 1C). These cubes can for example consist of a set of amplitude values of n traces or trace portions associated with a common offset or a common angle or the spatial distribution of the values of a common attribute derived from these amplitudes such as, for example, the acoustic impedance in P or S waves, the density or Lamé parameters, in a selected time window of size $m_j$. In this example, each variable $X_{j,k}$ groups together the values of the seismic attribute considered (seismic amplitude or elastic property) for a temporal sample within the analysis window. In this example, a cube comprises as many individuals as traces available. For analysis of the logs, this family has the form of a sequence of $m_j$ series of values, located by their position along the well (time or depth). This sequence can consist, for example, of all the logs of the tools of same physical nature, such as the various tools measuring the formation porosity, or the tools measuring various resistivity types, on a set of n time or depth points along one or more wells at the level of the underground formation studied. In this example, each variable $X_{j,k}$ groups together the values of the log attribute considered (resistivity, porosity, radioactivity, . . . ) for a time or depth point within the analysis window. In this example, a sequence comprises as many individuals as time or depth points available along the well(s) analysed.

The $m_j$ variables $X_{j,k}$ of a table $X_j$ define a space denoted by $S_j$ and are assumed to be centred. Let $D_n$ be the diagonal matrix of the weights of the individuals.

Let $\Pi_j$ be an orthogonal projection operator on space $S_j$ defined by:

$$\Pi_j = X_j(X_j^t D_n X_j)^{-1} X_j^t D_n$$

2—CALCULATION OF THE NEW ATTRIBUTES

The purpose of Generalized Principal Components Analysis (GPCA) is both to describe the proximities between the p families of variables and to describe separately each set by means of synthetic variables that are linear combinations of the initial variables. Then, what is common to all the sets or families, or to some of them only, and consequently what is different can be shown. GPCA allows reduction of the number of variables used to describe a data set and it allows multivariate filtering while keeping the multidomain structure of the initial data. To reach this objective, the first synthetic variable calculated, called $Z^{(1)}$, has to be such that:

1. The p orthogonal projections $Zj^{(1)}$ of $Z^{(1)}$ on spaces $S_j$ have to be as close as possible to one another;
2. In each group j, the dispersion of the n individuals projected on $Zj^{(1)}$ is maximum.

This is mathematically translated by the following conditions:

$$1. \max_{Z^{(1)}} \sum_{j=1}^{p} R^2(Z^{(1)}, Z_j^{(1)})$$

$$2. \max_{Z_j^{(1)}} \sum_{v=1}^{m_j} Cov^2(\bar{Z}_j^{(1)}, X_{j,v})$$

where $R^2$ is the multiple correlation coefficient and $Zj^{(1)}$ is the projection of $Z^{(1)}$ on space $S_j$ normalized at 1.

$$Z_j^{(1)} = \Pi_j^1 Z^{(1)}$$

A new synthetic variable $Z^{(2)}$ is then sought according to the same criteria. An orthogonality condition is added between the projections of variables $Z^{(k)}$ of the same set. The procedure stops when an orthogonal base is found in each space $S_j$. The number of variables $Z^{(k)}$ does not exceed the largest dimension of spaces $S_j$.

Rotation methods well known to the man skilled in the art can be implemented in each space thus found in order to optimize the correlation coefficients between the new variables and the initial variables.

The first variable $Z^{(1)}$ is the normalized eigenvector of covariance matrix $XX'D_n$ corresponding to the greatest eigenvalue. $Z^{(1)}$ is then projected on the p spaces $S_j$ and the regression of the $m_j$ variables by $Zj^{(1)}$ is calculated in each space. The matrix of the p juxtaposed residues $Xj^{(2)}$ defines the new space studied. This new space corresponds to the initial space from which the influence of $Zj^{(1)}$ has been removed in each set $S_j$. The $m_j$ variables of table $Xj^{(2)}$ define a subspace $Sj^{(2)}$ of $S_j$. The second component $Z^{(2)}$ is the normalized eigenvector of covariance matrix $X^{(2)}X^{(2)'}D_n$ of the residues corresponding to the greatest eigenvalue. $Z^{(2)}$ is projected on the p spaces $Sj^{(2)}$. The regression of the $m_j$ variables by $Zj^{(2)}$ is calculated in each space $Sj^{(2)}$. The regression carried out in each space $S_j$ ensures that the projection of $Z^{(2)}$ on space $Sj^{(2)}$ is orthogonal to the projection of $Z^{(1)}$ on space $S_j$.

Calculation of the eigenvectors is carried out by means of any method known in the art.

In practice, matrix $XX'D_n$ being of order n, where n can be very great, the normalized eigenvector $V^{(k)}$ of matrix $X^{(k)'}D_n X^{(k)}$ associated with the greatest eigenvalue is calculated in a stage k. Vector $Z^{(k)}$ is then simply calculated by linear transformation $Z^{(k)} = X^{(k)}V^{(k)}$ and normalized.

Each set can be reconstituted with a small number of attributes. The initial variables of set j can be expressed as the sum of a linear combination of variables $Zj^{(k)}$ and of a residue. If all the variables $Zj^{(k)}$ of a set are used, the residue is zero. The coefficients of the linear combination are the coefficients calculated after each regression in spaces $S_j$.

One of the properties of the method according to the invention is that variables $Z^{(k)}$ are orthogonal two by two.

For interpretation of the synthetic variables calculated, then calculate for each set j:

1. The square of the correlation between variable $Z^{(k)}$ and variable $Zj^{(k)}$ of set j, indicating the degree of proximity between these two variables; and 2. the inertia percentage of set j explained by variable $Zj^{(k)}$.

The correlations between variables $Z^{(k)}$ and initial variables $X_{j,k}$ are also calculated to show possible relations between the $X_{j,k}$. The correlations between variables $Zj^{(k)}$ and $X_{j,k}$ of the same set j, or the correlations between variables $Zj^{(k)}$ for the same k can also be calculated.

The new synthetic variables thus created constitute the new geophysical attributes sought.

3—APPLICATION EXAMPLE

The method according to the invention was applied to three cubes of elastic properties (impedance P denoted by Ip, impedance S denoted by Is and density denoted by ρ) obtained after pre-stack joint elastic inversion, by means of the method described in the aforementioned French Patent 2,800,473, of seismic records grouped in cubes of common incidence angles. Each elastic property generates a set of seismic attributes or variables. The analysis time window consists of 19 signal samples taken from seismic records. The values of the elastic property for each temporal sample within the analysis window to be variables are considered. Each set thus consists of 19 variables made up of as many individuals as there are traces available. Since there are three variable sets, a total 57 variables exists. The three parameter cubes have been flattened in relation to a reference surface.

The synthetic variables $Z^{(k)}$ obtained summarize the respective information of the three elastic properties, while taking into account the relations between them.

3.1—Analysis of the Relations Between Impedances P, S and Density ρ

Table 1 hereunder gives the variance proportion in percentage explained by the projections of the first 8 synthetic variables $Z^{(1)}$ to $Z^{(8)}$ in the three sets. It shows that 8 variables are sufficient to summarize 87.4% of the variance of impedance P, 94.4% of the variance of impedance S and 88.4% of the variance of the density.

|    | $Z^{(1)}$ | $Z^{(2)}$ | $Z^{(3)}$ | $Z^{(4)}$ | $Z^{(5)}$ | $Z^{(6)}$ | $Z^{(7)}$ | $Z^{(8)}$ | .    |
|----|-----------|-----------|-----------|-----------|-----------|-----------|-----------|-----------|------|
| Ip | 23.4      | 24.5      | 6.3       | 13.1      | 9.8       | 3.1       | 3.8       | 3.4       | 87.4 |
| Is | 26.6      | 14.2      | 15.2      | 12.6      | 5.7       | 7.2       | 5.8       | 7.1       | 94.4 |
| .  | 16.9      | 14.1      | 13.6      | 10.2      | 8.0       | 9.4       | 10.1      | 6.1       | 88.4 |

Table 2 hereafter gives the square of the correlation between synthetic variables $Z^{(k)}$ and their projections on the three sets. This value indicates the degree of proximity between the variable and the set. The closer the value is to 1, the closer the variable is to its projection and therefore to the set.

|    | $Z^{(1)}$ | $Z^{(2)}$ | $Z^{(3)}$ | $Z^{(4)}$ | $Z^{(5)}$ | $Z^{(6)}$ | $Z^{(7)}$ | $Z^{(8)}$ |
|----|-----------|-----------|-----------|-----------|-----------|-----------|-----------|-----------|
| Ip | 0.48      | 0.79      | 0.38      | 0.72      | 0.71      | 0.24      | 0.02      | 0.30      |
| Is | 0.91      | 0.43      | 0.86      | 0.53      | 0.36      | 0.59      | 0.09      | 0.73      |
| .  | 0.78      | 0.49      | 0.77      | 0.46      | 0.65      | 0.79      | 0.96      | 0.46      |

For example, $Z^{(1)}$ is very close to Is and close to ρ, but far from Ip, whereas $Z^{(2)}$ is close to Ip but very far from Is and ρ. Out of the first 8 variables $Z^{(k)}$, three are close to Ip alone, two are close to both Is and ρ, one is close to Is alone, and two are close to ρ alone. It thus appears that Ip and Is do not contain the same information and that part of the information contained in Is and in ρ seems to be common.

3.2—Filtering of Impedances P, S and of the Density

The three elastic properties can be reconstituted with a limited number of new seismic attributes. The number of synthetic variables used for reconstitution can be different from one set to the next: it depends on the inertia percentage to be reconstituted/filtered.

3.3—Supervised and Non-Supervised Pattern Recognition of the New Attributes

It is possible to interpret geologically the new seismic attributes through a facies analysis with a supervised or non-supervised pattern recognition algorithm.

In supervised pattern recognition, it is necessary to select learning classes grouping together seismic events located in the vicinity of wells whose geologic interpretation has been carried out. This methodology allows classification of all of the seismic events according to the geologic characters observed in the wells.

In the present case, the geologic knowledge of the three available wells W1, W2 and W3, and the general geologic knowledge of the zone studied lead us to considering three classes: a first class corresponding to wells W1 and W2 represents turbidite sands, a second class corresponding to well W3 represents turbidite muds and a third class represents hemipelagites. Wells W1 and W2 showing close geologic characteristics, only the seismic events located around well W2 are used, well W1 serving as a blind test. The location of well W3 being uncertain, the seismic events used to characterize class 2 are located around a virtual well defined in the proximity of W3. Finally, since there are no well for class 3, a virtual well is defined from our general geologic knowledge. Each class consists of 121 seismic events (11×11). These events are used to calibrate a classification function which is then applied to the whole of the seismic events.

Figure 8:
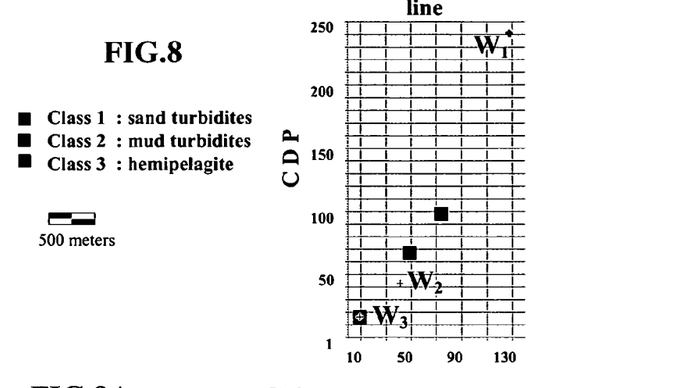
FIG. 8 shows the location of the learning traces used to calibrate the classification function within the context of the supervised pattern recognition of the first 8 new seismic attributes.

FIGS. 8A and 8B respectively show the assignments obtained and the most probable assignments, i.e. having an assignment probability greater than or equal to 80%. Well W1, used in blind test, is correctly assigned to the same class as well W2. Well W3 is located at the boundary of classes 1 and 2. Class 2 is distributed along a channeling form. The map of FIG. 8B shows that the results are stable: few events exhibit a bad assignment probability.

Figure 9A:
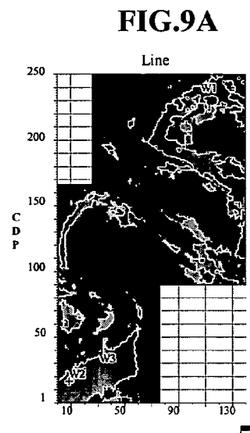
FIGS. 9A and 9B respectively show the assignments of the seismic events and the most reliable assignments of these events within the context of the supervised pattern recognition of the first 8 new seismic attributes.
Figure 9B:
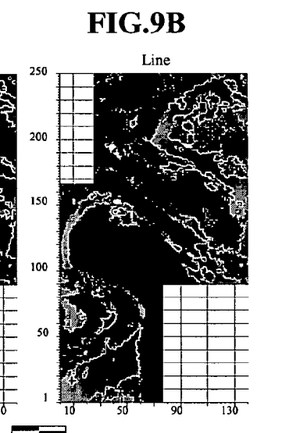
Figure 10A:
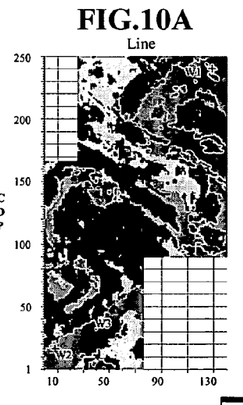
FIGS. 10A and 10B respectively show the assignments of the seismic events and the assignments of these seismic events within the context of the non-supervised pattern recognition of the first 8 new seismic attributes.
Figure 10B:
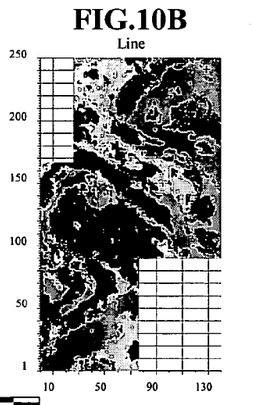

In non-supervised pattern recognition, the learning classes are formed using the modes of a multivariate probability density function calculated from the whole of the seismic events, in a space generated by the first eight new attributes. The seismic events of higher probability density that constitute the peaks of this density function are selected to carry out learning of the classification function. This function is then applied to the whole of the seismic events considered to assign them to one of the classes: FIGS. 9A and 9B show the assignments obtained, as well as the most probable assignments, i.e. having an assignment probability greater than or equal to 80%. The maps obtained are very close to the maps of FIGS. 8A and 8B. Class 3 of the supervised analysis corresponds to classes 3, 4 and 5 of the non-supervised analysis. Wells W1 and W2 are assigned to the same class and well W3 is still located at the boundary between classes 3, and especially 1 and 2. This convergence of results validates the interpretation of the supervised approach.

The invention claimed is:

1. A method for determining a nature of an underground zone, in terms of geology, fluid content variations and/or lithologic and petrophysical characteristics, by packing and filtering geophysical events readable on sets of available geophysical records, obtained by exploration of the underground zone, comprising:
   distributing the geophysical events into p families of geophysical variables each of a physical significance,
   forming, by combination of the geophysical variables, synthetic variables in a smaller number than a number of the geophysical variables, which are obtained by construction of an orthogonal vector base in each of p analysis sets of data of each of the p families, from which is derived a formation of an orthonormal vector base describing the p analysis sets; and
   using the orthonormal vector base for filtering and describing the geophysical events.

2. A method as claimed in claim 1, wherein formation of the synthetic variables is obtained by combining a principal component analysis technique or derived norm diagonalization methods and a regression technique.

3. A method as claimed in claim 1, wherein the synthetic variables are subjected to a rotation to improve correlations between initial variables and the synthetic variables.

4. A method as claimed in claim 1, wherein the synthetic variables are formed from families of seismic trace cubes obtained after a 3D seismic survey each corresponding to a same offset.

5. A method as claimed in claim 1, wherein the synthetic variables are formed from families of seismic trace cubes obtained after a 3D seismic survey each corresponding to a same angle of incidence.

6. A method as claimed in claim 1, wherein the synthetic variables are formed from families of seismic attribute cubes obtained by processing seismic trace amplitudes obtained after a 3D seismic survey.

7. A method as claimed in claim 1, wherein the synthetic variables are formed from families of seismic trace cubes obtained by successive seismic explorations in the underground zone.

8. A method as claimed in claim 1, wherein the synthetic variables are formed from families of seismic attribute cubes formed by processing seismic trace amplitudes obtained by successive seismic explorations in the underground zone.

9. A method as claimed in claim 1, wherein the synthetic variables are formed from families of log attribute measurements of a different physical nature.

10. A method as claimed in claim 9, wherein the synthetic variables are formed from resistivity measurement families.

11. A method as claimed in claim 9, wherein the synthetic variables are formed from families of measurements linked with radioactivity of a formation of the underground zone.

12. A method as claimed in claim 9, wherein the synthetic variables are formed from families of measurements linked with porosity of a formation of the underground zone.

13. A method as claimed in claim 2, wherein the synthetic variables are subjected to a rotation to improve correlations between initial variables and the synthetic variables.

14. A method as claimed in claim 2, wherein the synthetic variables are formed from families of seismic trace cubes obtained after a 3D seismic survey each corresponding to a same offset.

15. A method as claimed in claim 3, wherein the synthetic variables are formed from families of seismic trace cubes obtained after a 3D seismic survey each corresponding to a same offset.

16. A method as claimed in claim 2, wherein the synthetic variables are formed from families consisting of seismic trace cubes obtained after a 3D seismic survey each corresponding to a same offset.

17. A method as claimed in claim 3, wherein the synthetic variables are formed from families of seismic trace cubes obtained after a 3D seismic survey each corresponding to a same angle of incidence.

18. A method as claimed in claim 2, characterized in that synthetic variables are formed from families of seismic attribute cubes obtained by processing seismic trace amplitudes obtained after a 3D seismic survey.

19. A method as claimed in claim 3, characterized in that synthetic variables are formed from families of seismic attribute cubes obtained by processing seismic trace amplitudes obtained after a 3D seismic survey.

20. A method as claimed in claim 2, wherein the synthetic variables are formed from families of log attribute measurements of a different physical nature.

21. A method as claimed in claim 3, wherein the synthetic variables are formed from families of log attribute measurements of a different physical nature.

22. A method as claimed in claim 2, wherein the synthetic variables are formed from families of seismic trace cubes obtained by successive seismic explorations in the underground zone.

23. A method as claimed in claim 3, wherein the synthetic variables are formed from families of seismic trace cubes obtained by successive seismic explorations in the underground zone.

24. A method as claimed in claim 4, wherein the synthetic variables are formed from families of seismic trace cubes obtained by successive seismic explorations in the underground zone.

25. A method as claimed in claim 5, wherein the synthetic variables are formed from families of seismic trace cubes obtained by successive seismic explorations in the underground zone.

26. A method as claimed in claim 6, wherein the synthetic variables are formed from families of seismic trace cubes obtained by successive seismic explorations in the underground zone.

27. A method as claimed in claim 2, wherein the synthetic variables are formed from families of seismic attribute cubes formed by processing seismic trace amplitudes obtained by successive seismic explorations in the underground zone.

28. A method as claimed in claim 3, wherein the synthetic variables are formed from families of seismic attribute cubes formed by processing seismic trace amplitudes obtained by successive seismic explorations in the underground zone.

29. A method as claimed in claim 4, wherein the synthetic variables are formed from families of seismic attribute cubes formed by processing seismic trace amplitudes obtained by successive seismic explorations in the underground zone.

30. A method as claimed in claim 5, wherein the synthetic variables are formed from families of seismic attribute cubes formed by processing seismic trace amplitudes obtained by successive seismic explorations in the underground zone.

31. A method as claimed in claim 6, wherein the synthetic variables are formed from families of seismic attribute cubes formed by processing seismic trace amplitudes obtained by successive seismic explorations in the underground zone.

32. A method as claimed in claim 7, wherein the synthetic variables are formed from families of seismic attribute cubes formed by processing seismic trace amplitudes obtained by successive seismic explorations in the underground zone.

* * * * *